US010107677B2

(12) United States Patent
Coombes et al.

(10) Patent No.: US 10,107,677 B2
(45) Date of Patent: Oct. 23, 2018

(54) LIGHT GUIDE SYSTEM USING LOW-RESOLUTION IMAGE SENSORS

(71) Applicant: Gooee Limited, St Albans (GB)

(72) Inventors: Simon Coombes, St Petersburg, FL (US); Shmuel Silverman, Novato, CA (US); Jonathan Couch, Wilshire (GB)

(73) Assignee: Gooee Limited, St Albans (GB)

( * ) Notice: Subject to any disclaimer, the term of this patent is extended or adjusted under 35 U.S.C. 154(b) by 0 days.

(21) Appl. No.: 15/936,593

(22) Filed: Mar. 27, 2018

(65) Prior Publication Data
US 2018/0216991 A1    Aug. 2, 2018

Related U.S. Application Data

(63) Continuation of application No. 15/592,400, filed on May 11, 2017, now Pat. No. 9,964,438.

(60) Provisional application No. 62/397,683, filed on Sep. 21, 2016.

(51) Int. Cl.
*G01H 1/04* (2006.01)
*G01J 1/04* (2006.01)
*G01J 1/42* (2006.01)

(52) U.S. Cl.
CPC .......... *G01J 1/0422* (2013.01); *G01J 1/0425* (2013.01); *G01J 1/4228* (2013.01)

(58) Field of Classification Search
CPC ....... G01J 1/0422; G01J 1/4228; G01J 1/0425
See application file for complete search history.

(56) References Cited

U.S. PATENT DOCUMENTS

| 5,991,048 | A | 11/1999 | Karlson et al. |
| 7,527,437 | B2 | 5/2009 | Santos et al. |
| 9,332,610 | B2 | 5/2016 | Kuo et al. |
| 2006/0237636 | A1* | 10/2006 | Lyons ................. F21K 9/00 250/228 |
| 2010/0020550 | A1 | 1/2010 | Kawashima et al. |
| 2011/0233392 | A1 | 9/2011 | Amante |
| 2017/0267175 | A1* | 9/2017 | Ichikawa ............ B60Q 11/005 |

FOREIGN PATENT DOCUMENTS

DE    102012210743 A1    1/2014

* cited by examiner

*Primary Examiner* — Tony Ko
(74) *Attorney, Agent, or Firm* — Moyles IP, LLC

(57) ABSTRACT

A system for transporting high luminous intensity light from at least one luminaire to a destination area is disclosed. The system may include a light guide that carries light from the luminaire to a plurality of sensors located on a Printed Circuit Board (PCB). The PCB may be attachable anywhere the luminaire is located. While collecting light rays originating from the luminaire and delivering them to the light sensors, the light guide may perform a plurality of operations to modify the characteristics of the collected light rays. The plurality of operations performed by the light guide on the light rays may support the accuracy and longevity of the light sensors on the PCB. Further, the light guide allows the sensor subsystem to be proximal to or distant from the luminaire.

20 Claims, 9 Drawing Sheets

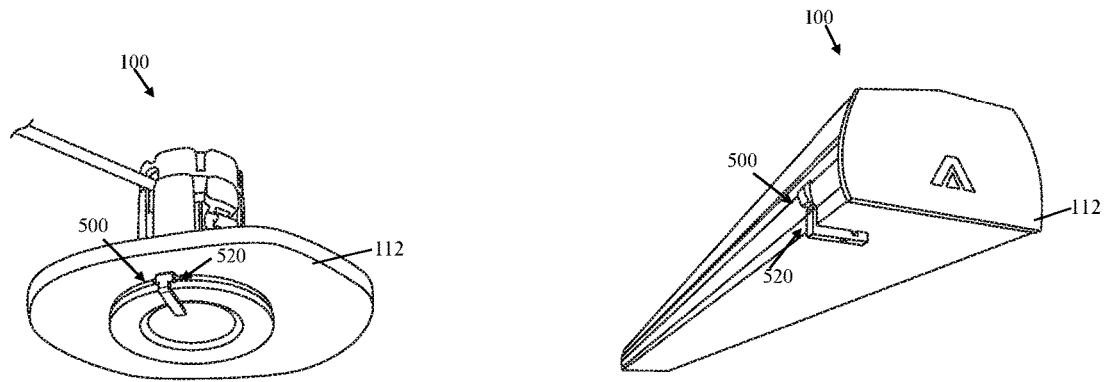
FIG. 9A
FIG. 9B
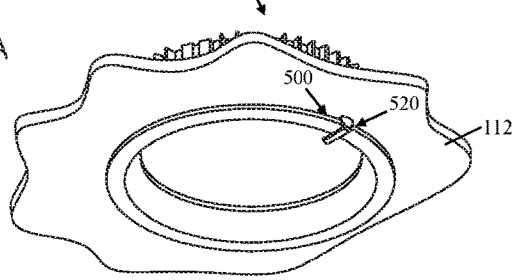
FIG. 9C

LIGHT GUIDE SYSTEM USING LOW-RESOLUTION IMAGE SENSORS

CROSS-REFERENCE TO RELATED APPLICATIONS

This application is a continuation of U.S. application Ser. No. 15/592,400 filed May 11, 2017, which claims the benefit of U.S. Provisional Application No. 62/397,683 filed Sep. 21, 2016, each of which is incorporated herein by its entirety.

FIELD

Embodiments of the present disclosure generally relate to a system and a method to provide a light guide. More specifically, the disclosure relates to a light guide that carries light from a luminaire to a sensor system located on a Printed Circuit Board (PCB).

BACKGROUND

A light guide is a device designed to transport light from a light source to a destination area with minimal loss, and homogenously distribute the carried light in the destination area. Light is transmitted through the light guide by means of total internal reflection. Light guides are usually made of optical grade materials such as acrylic resin, polycarbonate, epoxies, and glass. Light guides are applicable in different fields of applications like medical equipment's, communication equipment's, industrial control equipment's, small space access lightings, etc. Useful in numerous applications, light guides may be used to carry lights from LED lamps on PCBs to front panels to be used for status indications, light guides may be used to collect and direct lights to backlight Liquid Crystal Display (LCD) panels or legends, and light guides may also be used as a means to illuminate grid patterns on a see through window, and so on.

Light guides may include customized shapes and a variety of lens caps. Light guides are compatible for use with either surface-mount or through-hole luminaires. Light guides are also capable of being either panel mounted or PCB mounted. Light guides may include various body types, such as flexible body types or rigid body types. The rigid body type light guides are often produced with hard plastic materials and may include either a vertical construction or a right-angle construction. The rigid body type light guides are capable of redirecting luminaire light generated outputs to a desired location with minimal loss of intensity. The rigid body type light guides may be ideal if luminaires are mounted on a PCB positioned immediately behind a front panel. On the other hand, flexible light guides are constructed with optical grade plastic materials that provide less rigidity, which allows them to transport light from a board at custom, user-specified, subtle angles ensuring easy integration around existing components. Both rigid and flexible light guides can come in single or multi-unit configurations.

Light guides may be manufactured in different shapes and sizes, such as, for example, cylindrical (wherein the cross-section is oval), rectangular (wherein the cross-section is square), and conical (wherein the cross-section increases in size from the entrance end to exit end). They may also include specialized/irregular shapes, such as, an arrow, a star, a quarter moon, etc. To achieve illumination in corners of light guides with rectangular or specialized shapes, the corners often include a radius greater than 0.5 mm (0.020 in.) and the corners are not sharp. The light guide shape may gradually change along its length. For example, the light guide may include a substantially circular shape at the entrance end (to accommodate the luminaire) and include a square shape at its exit end. The design of a light guide typically depends on three crucial factors: a) effective flux coupling to get the light from a luminaire into the light guide with minimal loss; b) transmitting the light through the light guide towards the exit surface; and, c) allowing the light to escape through the exit surface with minimal loss.

The inner surface finish of a light guide is very important to ensure proper operation. The sides parallel to the direction of light travel must be designed correctly to affect the total internal reflection and refraction. The entrance portion of the light guide must be smooth, and contoured to match the luminaire in order to allow light rays to enter with minimal reflection and then scatter, while the exit portion of the light guide must be diffused. A diffused exit may include random critical angles across its surface that provides a high probability that light rays can escape and may further help to scatter the light rays, thus producing a wide radiation pattern. For effective flux coupling and light capture, the entrance end of the light guide must be smooth and flat or concave contoured to match the light output radiation pattern and package configuration of the mating luminaire.

Existing light guide designs are specific to luminaires' shapes and designs, which may limit their use with LED based luminaires in general. LED based luminaire designs and shapes are easy to modify and manufacture, which leads to rapid field upgrades, with new designs coming out daily.

In view of the disadvantages associated with currently available currently available light guide devices and methods, there is a need for a system and a method to provide a light guide to carry light rays from a luminaire to a Printed Circuit Board (PCB), in such a manner that does not limit the distance between the luminaire and the PCB. Additionally, there is a need for a light guide that is adapted to be coupled to/affixed on various luminaires, such that the light guide performs a plurality of operations/functions on a light that exits the luminaire in favor of the light sensors. The PCB is attachable anywhere in an environment where the luminaires are located via a sensor clip (prior art). The PCB includes multiple sensors. Some of the sensors are light sensors while others face the environment (environment sensors). The plurality of operations performed by the light guide on the light supports the light sensors and the longevity and usability of the system.

BRIEF DESCRIPTION

This disclosure generally describes a system for transporting high luminous intensity lights transported from a plurality of luminaires towards a destination area with minimal losses. The system includes a light guide, at least one Printed Circuit Board (PCB), and at least one luminaire. According to an aspect, the light guide may collect light rays originating from the luminaire and deliver them to the light sensors, while also performing a plurality of operations to modify the characteristics of the light rays. The luminaire may be arranged separately from the sensors. The at least one luminaire may be physically connected with the at least one PCB via the light guide. According to an aspect, the PCB is attachable anywhere in any environment where the luminaire is located. Additionally, the PCB may include multiple sensors that are each coupled to the light guide. The plurality of operations performed by the light guide on the light may help support the accuracy and longevity of the light sensors on the PCB. Additionally, the light guide may allow a sensor subsystem to be proximal to or distant from the luminaire.

Embodiments in accordance with the present disclosure provide a system that includes a gateway. In an embodiment, the system includes non-limiting types of hardware/wire/bus interfaces between the gateway and the sensor devices, e.g., the number of wires, the type of wires or bus connectors. According to an aspect, the interfaces included are sensor interfaces, which may be configured as simplified connections, such as, for example analog interface connectors and/or electrical/digital bus connectors. The gateway may be capable of communicating with and handling a plurality of sensors and sensor protocols via its sensors' interface. According to an aspect, the gateway continuously receives performance measurements from the attached sensors via the sensor subsystem. The gateway may include updatable software. In an embodiment, the software is updated to handle new or different protocols and/or interfaces. The protocols may include dimming protocols, sensor interface protocols, discovery protocols and gateway backend control protocols.

BRIEF DESCRIPTION OF THE FIGURES

A more particular description will be rendered by reference to specific embodiments and features thereof that are illustrated in the appended drawings. Understanding that these drawings depict only typical embodiments thereof, and are not therefore to be considered to be limiting of its scope, exemplary embodiments will be described and explained with additional specificity and detail in the following detailed description of embodiments thereof and, conjunction with the accompanying drawings, in which:

FIGS. 9A, 9B, and 9C, are perspective view of a light pipe is encased in a sensor clip and attached to 3 different luminaire designs, according to an embodiment.

Figure 1:
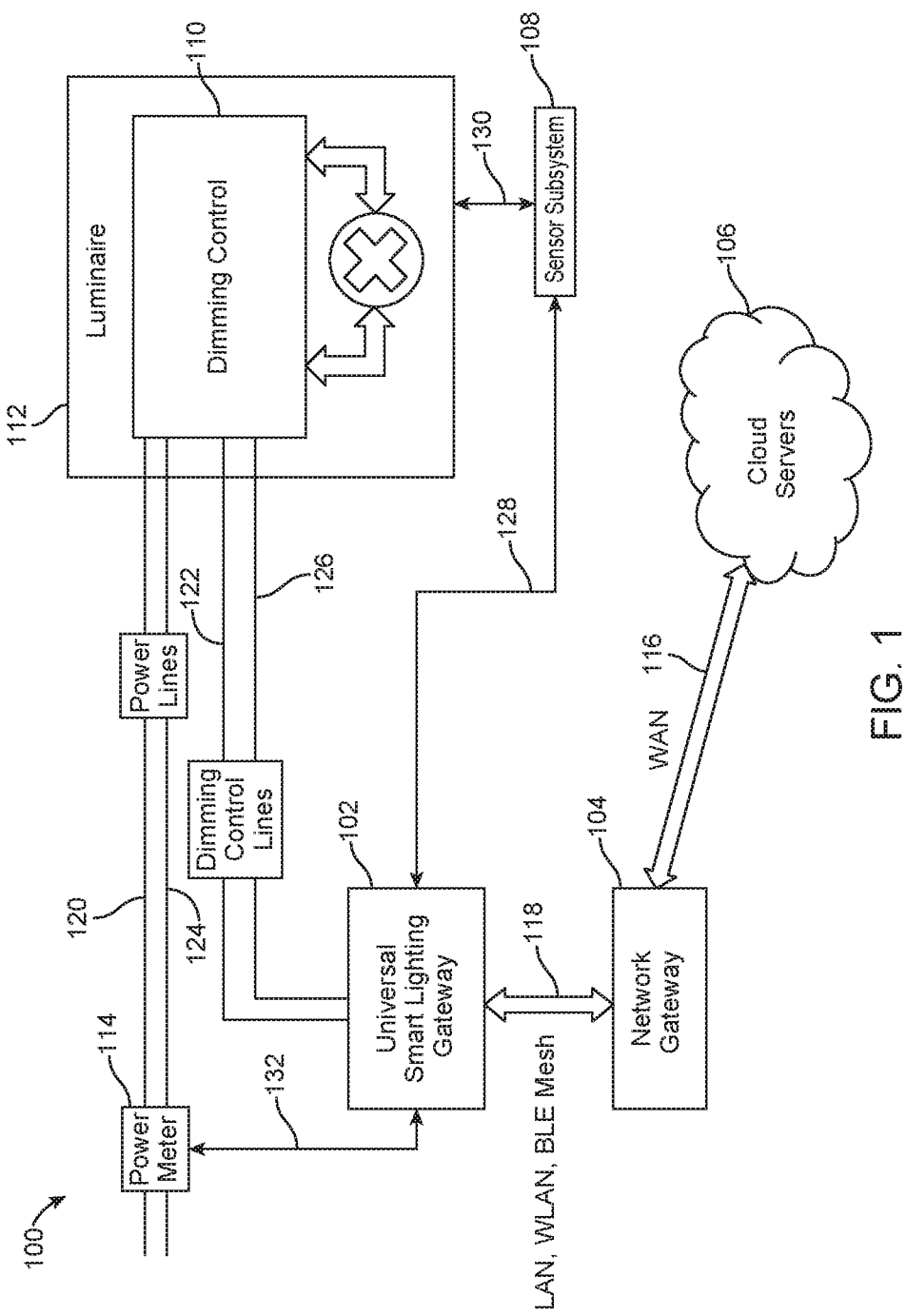
FIG. 1 is a schematic of a gateway system, according to an aspect.

Various features, aspects, and advantages of the embodiments will become more apparent from the following detailed description, along with the accompanying figures in which like numerals represent like components throughout the figures and text. The various described features are not necessarily drawn to scale, but are drawn to emphasize specific features relevant to some embodiments.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, reference numerals have been used, where possible, to designate like elements common to the figures.

DETAILED DESCRIPTION

The term "module" as used herein refers to any known or later developed hardware, software, firmware, artificial intelligence, fuzzy logic, or combination of hardware and software that is capable of performing the functionality associated with that element.

The term "computer-readable medium" as used herein refers to any tangible storage and/or transmission medium that participates in storing and/or providing instructions to a processor for execution. Such a medium may take many forms, including but not limited to non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

Reference will now be made in detail to various embodiments. Each example is provided by way of explanation, and is not meant as a limitation and does not constitute a definition of all possible embodiments.

For purposes of illustrating features of the embodiments, various configurations of the embodiments will now be introduced and referenced throughout the disclosure. Those skilled in the art will recognize that these configurations are illustrative and not limiting and are provided purely for explanatory purposes.

FIGS. 1-9 illustrate exemplary embodiments of a system 100 including a light guide 500 configured to carry light from a plurality of luminaires 112 to a standalone Printed Circuit Board (PCB). According to an aspect, the luminaire 112 may be located at a certain distance from the PCB. The light guide 500 may physically connect the standalone PCB with the luminaire 112. In an embodiment, the standalone PCB includes at least one sensor that is capable of sensing a plurality of information. The standalone PCB may be physically connected to the gateway 102 and may transmit the information collected by the at least one sensor towards the gateway 102 for further processing.

Figure 3:
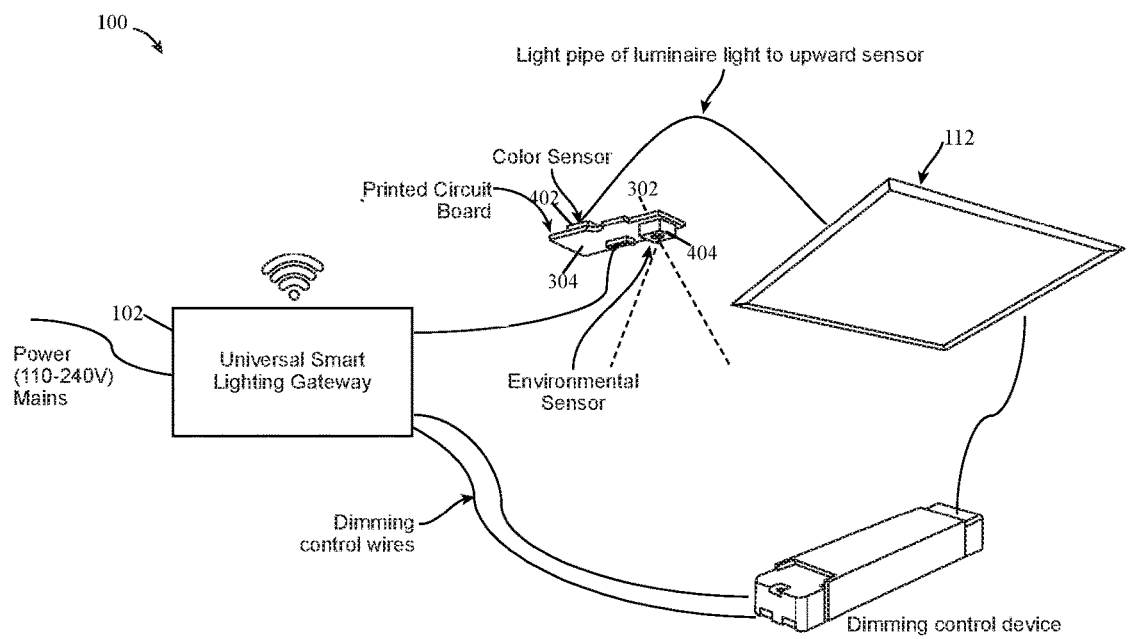
FIG. 3 is a perspective view of a light guide, illustrating a light pipe system and its connectivity, according to an aspect.

According to an aspect, the standalone PCB is attachable anywhere in an environment where the luminaires 112 are located. In one embodiment, the PCB is part of a sensor clip 108 that is attachable via the clip to a luminaire 112, or a panel in the ceiling, or to other devices in the environment. The PCB may include one upward facing/looking sensor 402 and one downward facing/looking sensor 404. According to an aspect, the upward facing/looking sensor 402 and the downward facing/looking sensor 404 may be placed back to back (i.e., 180°) to each other. As illustrated in FIG. 3, the upward facing sensor may be provided on a first surface 302 of the PCB, while the downward looking sensor is coupled to a second surface 304 of the PCB. In an embodiment, the upward facing/sensor senses the light coming from the luminaire 112, while the downward looking sensor senses the environment around the luminaire 112. The PCB may be physically connected to the gateway 102 via a sensor communication cable.

According to an aspect, the luminaire 112 may be arranged such that it is collocated with the PCB, separated from or attached to the PCB, or located at a set distance from the PCB. In one embodiment, the light guide 500 includes a flexible fiber optic (flexible light pipe) 522. In an embodiment, high luminous intensity light is emitted by the luminaire 112, enters the light pipe sensor system and propagates through the light pipe sensor system. The flexible light pipe 522 may perform a dampening operation on the propagating light rays via a dampening chamber arranged at the base of the light pipe before the light reaches the color sensor. The dampening operation may reduce a lux/intensity of the propagating light rays. In an embodiment, the light pipe is attached to a collimator, which homogenously distributes the processed light rays with reduced lux over the color sensor. Performing a dampening operation by the flexible fiber optic based light pipe may help to extend the longevity of the color sensor.

FIG. 1 is an illustrative embodiment of the system 100. According to an aspect, the system 100 may be configured for transporting high luminous intensity lights coming out of a plurality of luminaires 112. According to an aspect, the system 100 carries the high luminous intensity lights towards a destination area/environment with minimal loss of the lights. According to an aspect, the system 100 includes a gateway (universal smart lighting gateway) 102 arranged in the environment. The system 100 may further include a luminaire 112. The luminaire 112 may be a single luminaire system having one luminaire 112 or a multiple luminaire system having at least two luminaires 112. According to an aspect, the luminaire 112 is connected with a single common interface to power lines 120, 124 and dimming control lines 122, 126. According to an aspect, a power meter 114 is electrically connected to and positioned between the gateway 102 and the luminaire 112 on the power lines 120, 124. According to an aspect, the power meter 114 is connected to the gateway 102 via the power meter interface 132.

Figure 2:
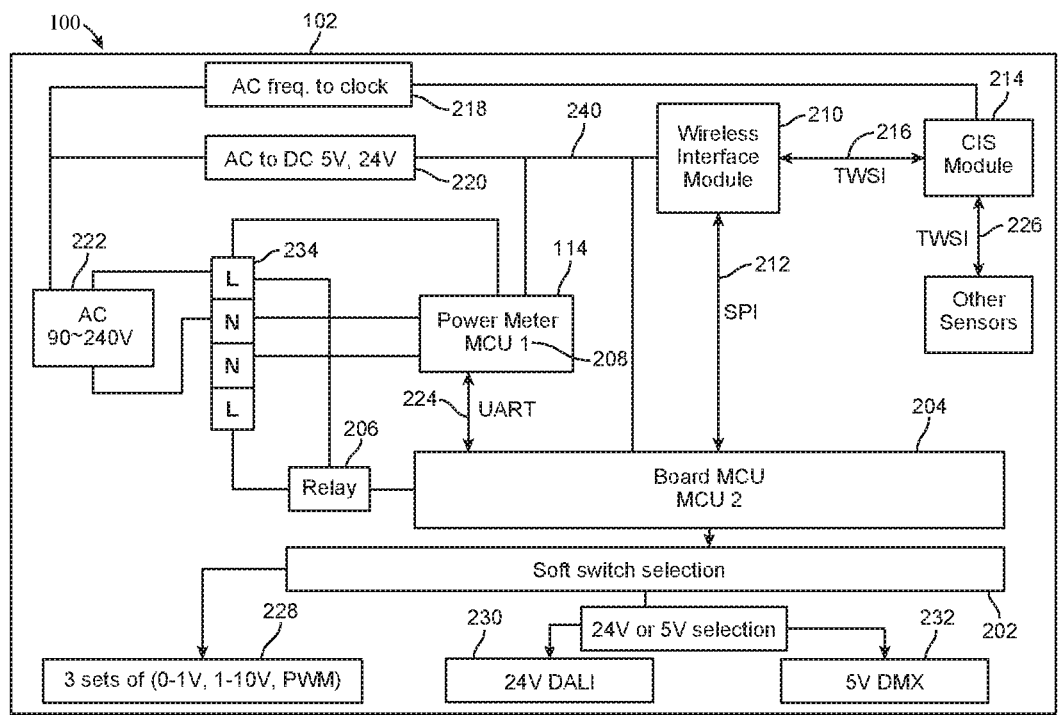
FIG. 2 is a schematic of a gateway including sensors and connections to the sensors, according to an aspect.

FIGS. 1 and 2 illustrate various embodiments of the power meter 114 connections. According to an aspect, the power meter 114 includes a sensor subsystem/a sensor clip subsystem 108 that is coupled to/connected to the luminaire 112 on one side and is coupled to/connected to the gateway 102 on the other/opposing side. In an embodiment, a connection 130 is provided to connect the sensor subsystem 108 directly the gateway 102 and the luminaire 112. The connection 130 to the luminaire 112 may be a physical connection. According to an aspect, the connection 130 is varied/flexible, that is, the connection 130 is not limited to a specific location. The location of the sensor clip 108 may be different for various types of sensors and luminaires 112 that need to be positioned. The gateway 102 may include a backhaul interface 118. The backhaul interface 118 may be a wired or a wireless Local Area Network (LAN), including one or more of Mesh Bluetooth Low Energy (Mesh BLE), WLAN, ZigBee, and/or Ethernet LAN. In an embodiment, the backhaul interface 118 is Mesh BLE. According to an aspect, the gateway 102 is connected with a network gateway 104, which resides between local networks to a wide area network (WAN) 116, and via this WAN 116 to cloud computers/servers 106 for operational and management interfaces. In an embodiment, the system 100 further includes a dynamic discovery mechanism of the dimming protocol, which runs over the dimming control lines.

The system 100 discussed hereinabove in connection with FIG. 1, are similar to the systems described hereinbelow with reference to FIGS. 2-9. Thus, for purposes of convenience, and not limitation, the various features, attributes, and properties, and functionality of the systems discussed in connection with FIGS. 2-9 are not repeated hereinbelow.

FIG. 2 illustrates the system 100 including the Universal Smart Lighting Gateway 102, sensor subsystem modules and sensor communications (not shown). According to an aspect, the sensor subsystem modules are encapsulated within the sensor clip (not shown). In FIG. 2 and according to an aspect, the system 100 includes a soft switch 202 to select between different electrical dimming interfaces. This soft switch 202 may be actively used in the search for the correct protocol between the gateway 102 and a dimming luminaire 112 (not shown in this figure).

In an embodiment, the system 100 includes a dimming control mechanism performed via a hard switch (not shown in this figure). The protocol modules 228, 230, and 232 may be the software implementation of the dimming interfaces that reside in the gateway 102. In an embodiment, the supported dimming protocol includes several sets of protocols 0V-10V, 1V-10V, PWN 228 protocols over 0V-10V and/or 1V to 10V, a 24V DALI 230 protocol, and a 5V DMX 232 protocol. The protocols include algorithms, which are implemented in the Micro Controller Unit 2 (MCU-2) 204. The MCU-2 204 may be powered by the AC to DC 5V, 24V 220 via the power line connection 240. According to an aspect, the MCU-2 204 is also connected to a power meter 114 via MCU 1 and the UART 224. The MCU-2 may also be connected to a Relay 206. MCU-2 is also connected to a Wireless Interface Module (WIM) 210 via a Serial Peripheral Interface (SPI) bus 212. In an embodiment, the MCU-2 204 is also controlling the Relay 206 that is designed to be able to cut off the current to the luminaire 112 upon a decision by the MCU-2 204. The power cutoff can be used to disconnect power from the controlled luminaire subsystem (See, for example, FIG. 1). In an embodiment, the Wireless Interface Module (WIM) 210 is implemented as Bluetooth Low Power (BLE) device using Mesh BLE protocol to connect with other devices as well having SPI bus 212 and Inter-Integrated Circuit two-wire serial interface bus ("TWSI") 216. The WIM 210 is connected to the Camera Interface System (CIS) 214, which may be the environmental sensor and RGB sensor combination device. The CIS module 214 can be extended via Two-Wire Serial Interface ("TWSI") bus 226 with other sensor modules. The CIS module 214 requires a clock, which may be received via the AC Frequency to clock module interface 218. According to an aspect, the WIM 210 requires power, which may received via the AC to DC 5V to 24V 220 via power interface line 240. The AC Power 90V-240V 222 may be relayed to the MCU2 204 and from it to the soft switch 202 for power selection for the dimming protocol interfaces. The AC Power may additionally be relayed to the power meter 114, which measures all power delivered to the luminaire 112. According to an aspect, the LNNL 234 is the physical electrical line connections.

According to an aspect and as illustrated in FIG. 3, the system 100 includes a light pipe that is connected to the luminaire 112. The PCB may be physically connected to the gateway 102. To be sure, the PCB may be attachable anywhere in an environment that includes a luminaire 112. As illustrated in FIG. 3, the PCB may be configured to face away from the luminaire 112.

According to an aspect, the PCB may include sensors. The sensors include an upward facing color/light sensor and a downward facing/environmental sensor. The upward facing sensor may be positioned on the first surface 302 of the PCB, i.e., at the PCB end of the light pipe, facing the light pipe and receiving light emitted by the luminaire 112 and propagated via the light pipe. In an embodiment, the environmental sensor is located on the opposite side/second surface 304 of the PCB and is facing downwards towards the environment. The PCB may be connected to the gateway 102 via sensor interface links.

Figure 4:
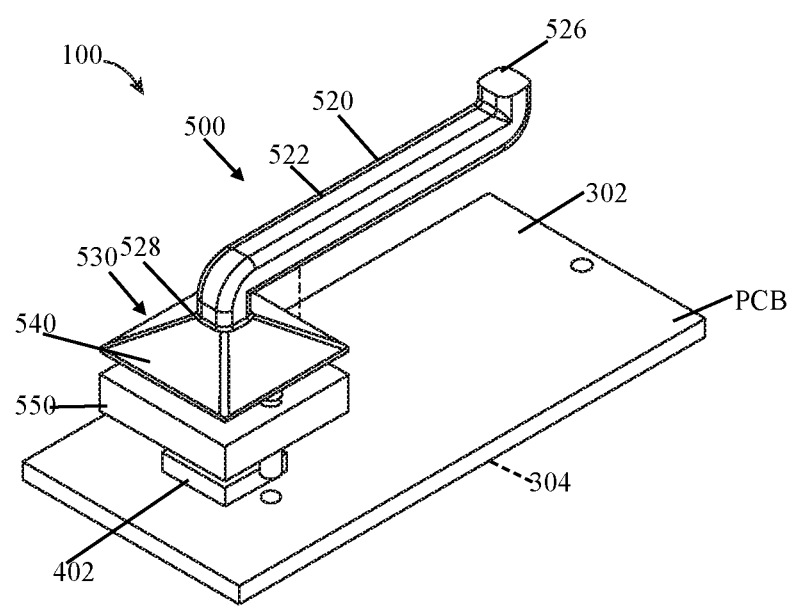
FIG. 4 is a partial perspective view of a flexible light pipe, according to an embodiment.

The upward facing color sensor may be a single sensor or an array of sensors, each color sensor being capable of measuring multiple color channels ("color sensor") while directly facing the luminaires 112. The light rays emitted by the luminaire 112 reach the color sensor through a light guide 500 (FIG. 4). The color sensor may be used to measure both the color content and the color intensity of the lights produced by a plurality of luminaires 112. According to an aspect, the color sensor is based on a single color or a plurality of colors. In one embodiment, the color sensor based on the plurality of colors is a "RGB sensor". By delivering the light to the color sensor through the light guide 500, one sensor housing can serve a multitude of luminaires 112 (circular, square, linear, etc). Additionally, the light guide 500 may reduce the lux intensity read by the sensor (which can be a problem for high wattage fittings) to avoid over exposure and accelerated aging of the filters inside the sensor.

The downward looking sensor, which could also be a single sensor or an array of sensors, may be a low resolution imaging sensor ("environmental sensor"). According to an aspect, the environmental sensor may need to be exposed in such a manner that it faces the environment below the plurality of luminaires 112 with a clear line of sight of the environmental sensor. The environmental sensor may be used for monitoring the environment around the luminaires 112. According to an aspect, the environmental sensor includes three or more different sensors, such as, for example, a low-resolution image sensor, an ambient light sensor, and a temperature sensor. As used herein, a low-resolution image sensor refers to a sensor that typically contains less than approximately 1200 pixels, for example, and without limitation, a 32×32 sensor. For example, and without limitation, the sensor may be capable of detecting and determining how many human individuals or other objects are in an environment in which the sensor is installed and the position and orientation of each individual/object. However, the sensor may not have enough resolution to identify or distinguish the individuals/objects, especially at certain distances from the individuals/objects. Without limitation, this disclosure refers to the downward looking sensor as the "environmental sensor". The environmental sensor may include one or more of each of the types of different sensors described herein. According to an aspect, the combination of sensors included in the aforementioned systems gather enough/sufficient information to measure the environment, as described in this disclosure. To be sure, various types and quantities of the environmental sensors may be used to characterize the environment in which they are located.

In an embodiment, the light guide 500 performs a dampening operation on the propagating high luminous intensity light rays. The dampening operation reduces the high lux present in the light coming from the luminaire 112 while passing through the light guide 500. In another embodiment, after the dampening operation, a filtering operation may also be necessary to completely remove any invisible IR element and/or UV rays present in the incoming light rays from the luminaire 112. The appropriate filters pass part of or the entire visible spectrum but block the invisible UV rays and/or IR elements.

FIG. 4 illustrates the system 100 including a light pipe 520, according to an embodiment. According to an aspect, the light pipe 520 is flexible and includes a fiber optic light pipe guide. The flexible fiber optic light pipe 522 carries the light from the luminaire 112 to the color sensor located on the PCB. In use, the light emitted by the luminaire 112 may enter the flexible light pipe 522 at an entry point/first end 526 and propagate through the flexible light pipe 522. In an embodiment, the other/second end or exit point 528 of the flexible light pipe 522 is connected to a collimator 530 that performs dampening and filtration operations on the incoming lights (if necessary). The flexible light pipe 502 may be attached with the collimator 530, which may be responsible for homogenously distributing the light rays with reduced lux (if needed) over the color sensor attached to the PCB. According to an aspect, the flexible light pipe 522 is long, and is connected to a dampening/filtering chamber 540 at its base (light exit point) 528, which leads to the color sensor.

Figure 5:
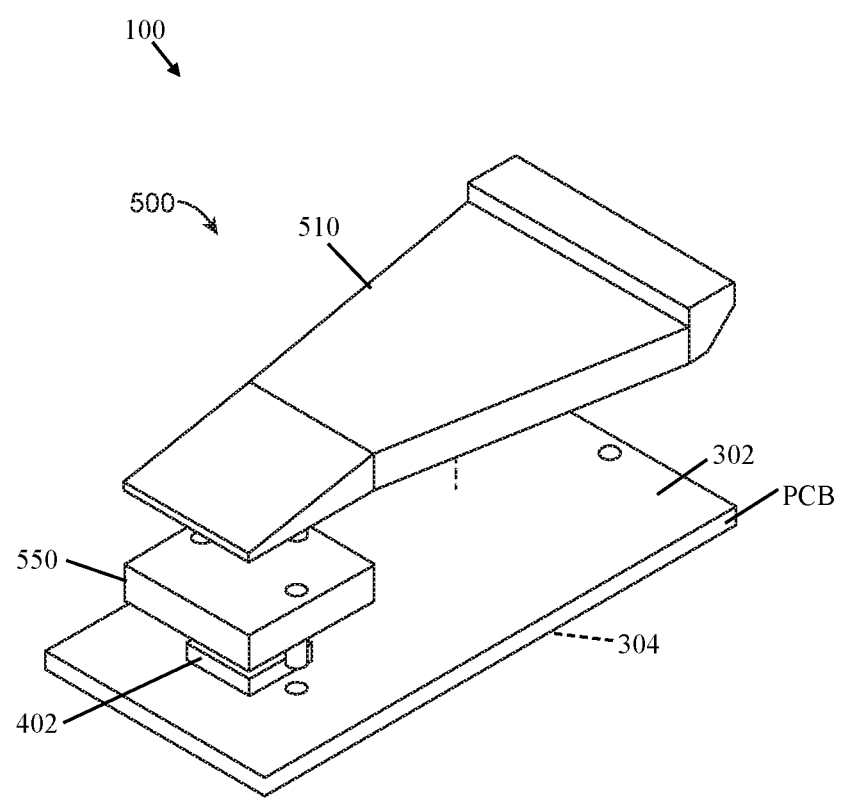
FIG. 5 is a partial perspective view of a collimator light pipe, according to an embodiment.

According to an aspect, and as illustrated in FIG. 5, the system 100 includes a light guide 500 configured as a collimator that carries the light from the luminaire 112 to the color sensor located on/attached to the PCB. The collimator light guide 510 may be of a fixed size and may be connected to a sensor clip (not shown), such that the light opening to the collimator can be positioned under the luminaire 112. In an embodiment, the PCB is attached to or embedded in the sensor clip with a moveable arm/extended arm that is operable to change the location of the collimator entry relative to the incoming luminaire light. According to an aspect, the collimator light guide 510 does not include the flexible fiber optic extension.

In an embodiment, the collimator 530 and/or the collimator light guide 510 narrows down the cross section of incoming light to a narrower interface with the color sensor. In other words, as illustrated in FIG. 4, the cross-section of the collimator 530 may include a diameter that reduces in size from the entry point of the light to an exit point of the collimator. After entering the collimator 530, the light rays may propagate towards the other side of the collimator 530 via a gradually narrowing funnel. According to an aspect, light rays that enter the collimator 530 start as parallel light rays that spread very minimally as they propagate. Since the entry point of the collimator 530 is wider than the exit point, the amount of light rays entering the collimator is high relative to the amount of light that reaches the sensors at the other end. The collimator 530 may help control the flow of the light that propagates towards the narrow end. According to an aspect, during the propagation, the collimator 530 performs a dampening operation to effectively reduce the lux of the light rays. The collimator 530 may thereafter homogenously distribute the light rays of the reduced lux over the color sensor, with or without dampening. When a dampening operation is performed by the collimator 530, the dampening operation may be selectable based on the type of light pipe guide used.

Figure 6:
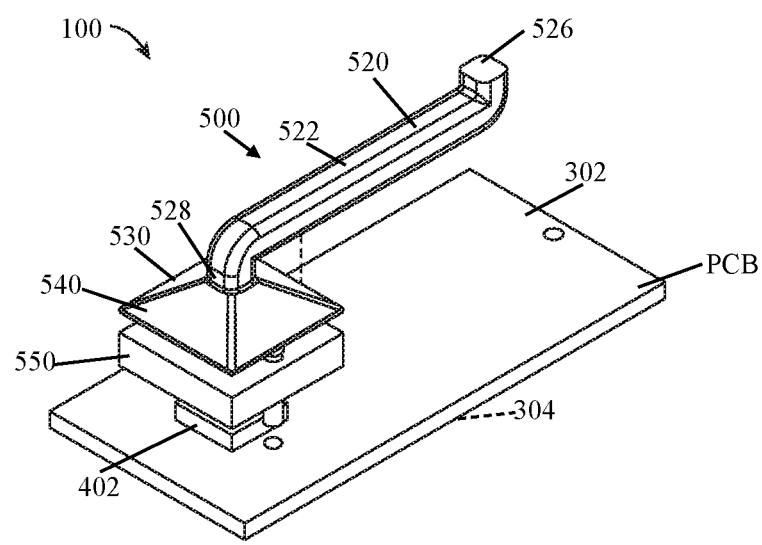
FIG. 6 illustrates an embodiment of a filtration operation of the flexible light pipe of FIG. 4, according to an embodiment.

FIG. 6 illustrates a filtration operation of the system 100. According to an aspect, after the dampening operation, a filtration operation may be necessary to remove any Infrared (IR) elements and/or Ultra Violet (UV) rays, which may be present in the light rays coming from the luminaire 112. The filtration operation may include appropriate filters 550, which may transfer/pass on part of the visible light spectrum or the entire visible light spectrum, while blocking the invisible ultraviolet (UV) rays and/or IR elements. The filters 550 may correct the incoming light rays by shifting the colors of the incoming light. According to an aspect, the filtering operation is performed at the sensor level by having additional filtering elements built into the PCB and at the base of the light guide 500. As illustrated in FIG. 4 and FIG. 6, the filtration elements may be part of the base collimator 530 into which the flexible light pipe 522 is connected. According to an aspect, welding glass is arranged between the diagnostic/upward looking sensor and the light pipe to filter out light rays having high UV content, into a more visible spectrum, thus helping to facilitate the use of simplified components in the system 100.

After the dampening and/or the filtering operation, a dampening chamber attached in between the color sensor and the light guide 500 or collimator light guide 510 homogenously spreads the processed incoming light rays onto the color sensor for further operations. The dampening and filtering operations can be also being performed in the dampening chamber with a filter inserted into this chamber.

Figure 7:
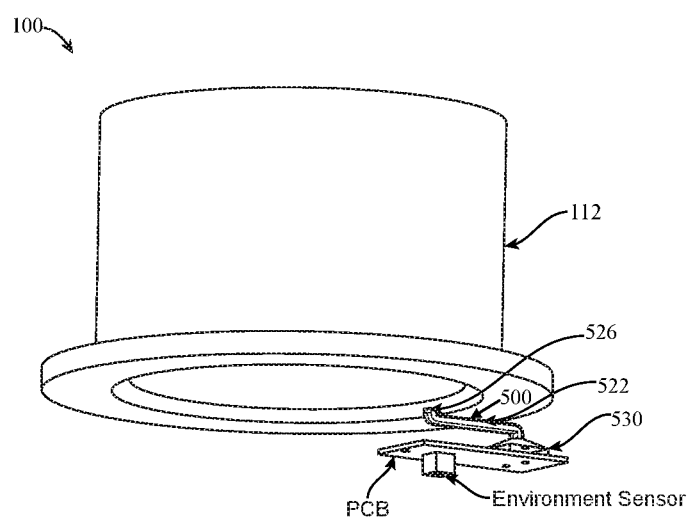
FIG. 7 is a perspective view of a light pipe including a fiber optic light pipe attached to a luminaire, according to an embodiment.

FIG. 7 illustrates the system 100 including a light guide 500 that includes a fiber optic light pipe attached to a luminaire 112, according to an embodiment. According to an aspect, the light pipe guide 500 includes the flexible fiber optic light pipe 522, described hereinabove, attached to the luminaire 112.

Figures 8A, 8B:
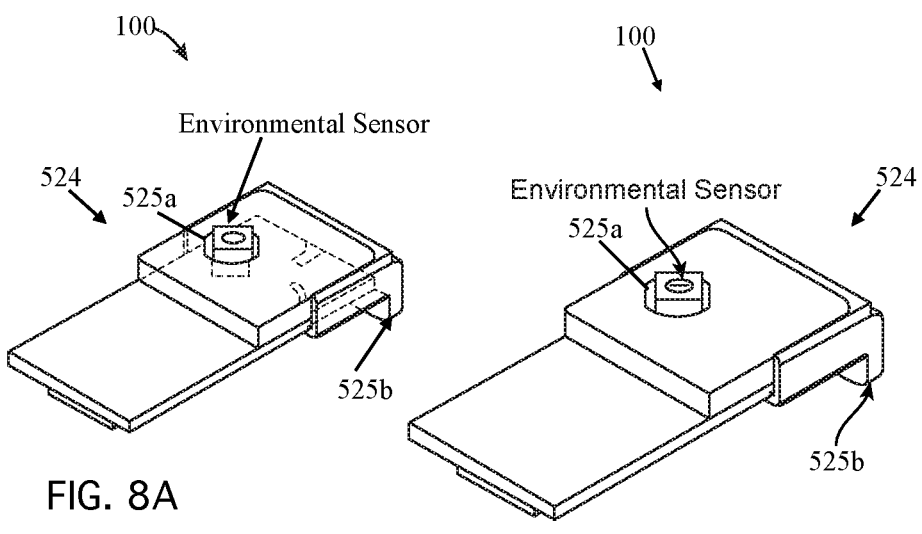
FIGS. 8A and 8B illustrate perspective views of an encased light pipe, according to an embodiment.

FIGS. 8A-8B each illustrate the system 100 including an encased light pipe guide 524. According to an aspect, the encased light pipe guide 524 has a first opening 525a arranged at the location of the environmental sensor. The encased light pipe guide may also include a second opening 525b configured to allow light to enter the casing of the light pipe guide 524.

FIGS. 9A, 9B, and 9C illustrate various embodiments of luminaires 112 having a light guide 500. The light guide 500 includes a light pipe 520, substantially as described hereinabove. According to an aspect, the light pipe 520 may be encased in a sensor clip and attached to 3 different luminaire 112 designs. To be sure, the light pipe may be used with various other luminaire 112 designs, and modified as needed to fit various luminaire 112 sizes.

Embodiments in accordance with the present disclosure include a method of carrying high luminous intensity light from a luminaire 112 to a PCB via a light guide. According to an aspect, the light guide, in all forms, delivers light rays in a consistent manner. The light guide system 100 may be insulated on its outer surface to prevent random light from entering the system 100 and changing the readings. The sensors may be programed to report and/or to notify changes in readings. According to an aspect, the system 100 is designed to react to any of the changes in readings, rather than to absolute readings. Thus, the amount of light entering the light guide may not be as significant as the need to maintain uniformity and consistency of the light, relative to the light pipe entry point.

The present disclosure, in various embodiments, configurations and aspects, includes components, methods, processes, systems and/or apparatus substantially developed as depicted and described herein, including various embodiments, sub-combinations, and subsets thereof. Those of skill in the art will understand how to make and use the present disclosure after understanding the present disclosure. The present disclosure, in various embodiments, configurations and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The components of the system illustrated are not limited to the specific embodiments described herein, but rather, features illustrated or described as part of one embodiment can be used on or in conjunction with other embodiments to yield yet a further embodiment. It is intended that the apparatus include such modifications and variations. Further, steps described in the method may be utilized independently and separately from other steps described herein.

The foregoing discussion has been presented for purposes of illustration and description. The foregoing is not intended to limit the present disclosure to the form or forms disclosed herein. Various features of the present disclosure are grouped together in one or more embodiments, configurations, or aspects for the purpose of streamlining the disclosure. The features of the embodiments, configurations, or aspects of the present disclosure may be combined in alternate embodiments, configurations, or aspects other than those discussed above. This method of disclosure is not to be interpreted as reflecting an intention that the present disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity, unless the context clearly indicates otherwise. As such, the terms "a" (or "an"), "one or more" and "at least one" can be used interchangeably herein. It is also to be noted that the terms "comprising", "including", and "having" can be used interchangeably. Furthermore, references to "one embodiment", "some embodiments", "an embodiment", "an aspect" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value.

Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that variations in these ranges will suggest themselves to a practitioner having ordinary skill in the art and, where not already dedicated to the public, the appended claims should cover those variations.

Also, while the present disclosure describes exemplary embodiments, it should be appreciated individual aspects of the present disclosure are also contemplated.

Moreover, the description of the present disclosure has included descriptions of one or more embodiments, configurations, or aspects, and certain variations and modifications, other variations, combinations, and modifications that are within the scope of the present disclosure without departing from the essential scope contemplated, as may be within the skill and knowledge of those in the art, after understanding the present disclosure. In addition, many modifications may be made to adapt a particular situation or material to the teachings found herein without departing from the essential scope thereof. Furthermore, it is intended to obtain rights which include alternative embodiments, configurations, or aspects, to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Advances in science and technology may make equivalents and substitutions possible that are not now contemplated by reason of the imprecision of language; these variations should be covered by the appended claims. This written description uses examples to disclose the method, machine and computer-readable medium, including the best mode, and also to enable any person of ordinary skill in the art to practice these, including making and using any devices or systems and performing any incorporated methods. The patentable scope thereof is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A light guide system comprising:
a collimator light guide;
at least one printed circuit board comprising a first surface and a second surface;
at least one upward facing sensor coupled to the first surface of the at least one printed circuit board; and
at least one low-resolution image sensor coupled to the second surface of the at least one printed circuit board,
wherein the at least one printed circuit board connects the upward facing sensor and the low-resolution image sensor to the collimator light guide.

2. The light guide system of claim 1, wherein one of the at least one upward facing sensor and one of the at least one low-resolution image sensor are placed in a back to back arrangement with respect to each other.

3. The light guide system of claim 1, wherein the at least one upward facing sensor faces towards the direction of the light transmitted from a luminaire.

4. The light guide system of claim 1, wherein the at least one low-resolution image sensor is directed to monitor an environment in which a luminaire is installed.

5. The light guide system of claim 1, wherein the at least one upward facing sensor is a color sensor.

6. The light guide system of claim 1, wherein the at least one low-resolution image sensor is an environmental sensor.

7. The light guide system of claim 1, wherein the collimator light guide is configured to perform at least one of a dampening operation to reduce a lux of a high luminous intensity light emitted from a luminaire, and a filtration operation on the high luminous intensity light.

8. The light guide system of claim 7, wherein the collimator light guide is connected to a base dampening chamber that is configured to perform a dampening operation to reduce lux of the high luminous intensity light.

9. The system of claim 7, wherein the collimator light guide homogenously distributes light rays at the reduced lux over the color sensor.

10. The light guide system of claim 1, wherein the collimator light guide performs a filtering operation to remove any non-visible elements, the non-visible elements comprising at least one of infrared elements and ultraviolet elements present in the light emitted by a luminaire.

11. The light guide system of claim 1, further comprising:
a sensor clip,
wherein the printed circuit board is coupled to the sensor clip and the sensor clip is attachable to a luminaire.

12. A light guide system comprising:
a collimator light guide including an entry point and an exit point;
a filter coupled to the collimator light guide; and
at least one printed circuit board coupled the filter, the printed circuit board comprising a first surface and a second surface;
at least one upward facing sensor coupled to the first surface; and
at least one low-resolution image sensor coupled to the second surface,
wherein the at least one printed circuit board is configured to be physically connected to a luminaire via the collimator light guide.

13. The light guide system of claim 12, wherein the low-resolution image sensor is an environmental sensor.

14. The light guide system of claim 12, wherein
a high luminous intensity light emitted by the luminaire, and the collimator light guide is configured to homogenously distribute light rays of the high luminous intensity light over the upward facing sensor.

15. The light guide system of claim 12, wherein the collimator light guide further includes a diameter that reduces in size from the entry point to the exit point.

16. The light guide system of claim 12, wherein one of the at least one upward facing sensor and one of the at least one low-resolution image sensor are placed in a back to back arrangement with respect to each other, with the printed circuit board therebetween.

17. A light guide system comprising:
    a collimator light guide comprising an entry point and an exit point;
    a filter coupled to the collimator light guide;
    at least one printed circuit board coupled to the filter, wherein the at least one printed circuit board includes a first surface and a second surface, and wherein at least one upward facing sensor is coupled to the first surface, and at least one downward facing sensor is coupled to the second surface.

18. The light guide system of claim 17, wherein
    the upward facing sensor is a color sensor that faces towards the direction of a high luminous intensity light emitted from a luminaire, and
    the downward facing sensor is a low-resolution image sensor that is directed to monitor an environment in which the luminaire is installed.

19. The light guide system of claim 18, further comprising:
    a dampening chamber between the color sensor and the collimator light guide, the dampening chamber being configured to homogenously spread light rays onto the color sensor.

20. The light guide system of claim 17, wherein the filter is configured to block at least one of ultraviolet elements and infrared elements present in light emitted by a luminaire.

* * * * *